(12) United States Patent
Chu

(10) Patent No.: US 6,357,872 B1
(45) Date of Patent: Mar. 19, 2002

(54) EYEGLASSES WITH A ONE-PIECE LENS RAPIDLY CHANGEABLE

(76) Inventor: Li-Pin Chu, P.O. Box 90, Tainan City (TW)

( * ) Notice: Subject to any disclaimer, the term of this patent is extended or adjusted under 35 U.S.C. 154(b) by 0 days.

(21) Appl. No.: 09/887,358

(22) Filed: Jun. 25, 2001

(51) Int. Cl.[7] .................................................. G02C 1/04
(52) U.S. Cl. ...................................... 351/106; 351/103
(58) Field of Search ..................... 351/41, 44, 103–109

(56) References Cited

U.S. PATENT DOCUMENTS 5,703,669 A * 12/1997 Park ............................ 351/86
5,900,922 A * 5/1999 Moore ......................... 351/103

* cited by examiner

*Primary Examiner*—Huy Mai

(57) ABSTRACT

Eyeglasses with a one-piece lens rapidly changeable includes a frame pivoted with two temples at both sides and a one-piece lens fitted in the frame. The frame has two nosepieces and each having a flat supporting edge on its outer surface, and a hollow part formed inside a bridge and above the two nosepieces for a waist formed in a middle portion of the lens to be fitted in, letting two upper edges of the lens attached against the outer surfaces of the frame, and two central edges of the lens rested against the two flat supporting edges of the two nosepieces, whereby the frame and the lens can be joined together by correspondingly fastening and positioning to each other both in inside and outside attachments so as to achieve a firm assemblage and allow the lens to be fitted in or taken off the frame with fastness and convenience.

1 Claim, 5 Drawing Sheets

EYEGLASSES WITH A ONE-PIECE LENS RAPIDLY CHANGEABLE

BACKGROUND OF THE INVENTION

1. Field of the Invention

This invention relates to a pair of eyeglasses with a one-piece lens rapidly changeable, particularly to one provided with a frame pivoted with two temples at both sides and a one-piece lens correspondingly fitted in the frame, wherein the frame has two nosepieces disposed in a central portion and each having a flat supporting edge formed on an outer surface of each of the two nosepieces, and a hollow part formed inside a bridge and above the two nosepieces for a waist formed in a middle portion of the one-piece lens to be fitted in, letting two upper edges of the one-piece lens correspondingly attached against the outer surfaces of two upper edges of the frame and two central edges of the one-piece lens correspondingly rested against the two flat supporting edges of the two nosepieces, by which the frame and the one-piece lens are capable of being joined together by correspondingly fastening and positioning to each other both in inside and outside attachments so as to achieve a firm assemblage and allow the one-piece lens to be fitted in or taken off the frame with fastness and convenience.

2. Description of the Prior Art

A pair of known conventional eyeglasses, as show in FIG. 1, directly fixing a one-piece lens 40 to a frame 41 with screws 42 has the following disadvantages:

1. It is very dangerous for a user to wear such kind of eyeglasses because the screws 42 may be loosened to disconnect the one-piece lens 40 with the frame 41 after a period of use or excessive exercises, thus hurting the users' eyes.

2. The conventional method of fixing the one-piece lend 40 to the frame 41 with screws 42 is very troublesome in manufacturing parts and requiring auxiliary tools to help the assembling work, which is a matter of lacking economy and efficiency.

3. The one-piece lens 40 of such kind of eyeglasses is not easily disassembled; therefore, inexperienced users may damage the one-piece lens or other parts of the eyeglasses with carelessness.

4. The difficulty of dissembling the one-piece lens 40 from the frame 41 of such kind of eyeglasses is inconvenient for users to change different one-piece lenses with different colors and styles to meet with their requirements in different weathers or situations.

SUMMARY OF THE INVENTION

The main purpose of the invention is to offer a pair of eyeglasses with a frame permitting a one-piece lens to be fitted in directly without using screws to achieve the functions of a rapid and firm assemblage as well as a safe wear.

The main feature of the invention is to provide a pair of eyeglasses including an integral frame pivoted with two temples at both sides and a one-piece lens fitted in a lower portion of the frame, wherein the frame has two retaining edges formed along two upper edges of the frame, two nosepieces disposed in a central portion of the frame and each having a flat supporting edge formed on an outer surface of each of the two nosepieces, and a hollow part formed inside a bridge and above the two nosepieces; a waist formed in a middle portion of the one-piece lens capable of being fitted in the hollow part of the frame, letting two upper edges of the one-piece lens correspondingly attached against the outer surfaces of the two retaining edges of the frame and two central edges of the one-piece lens correspondingly rested against the two flat supporting edges of the two nosepieces.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
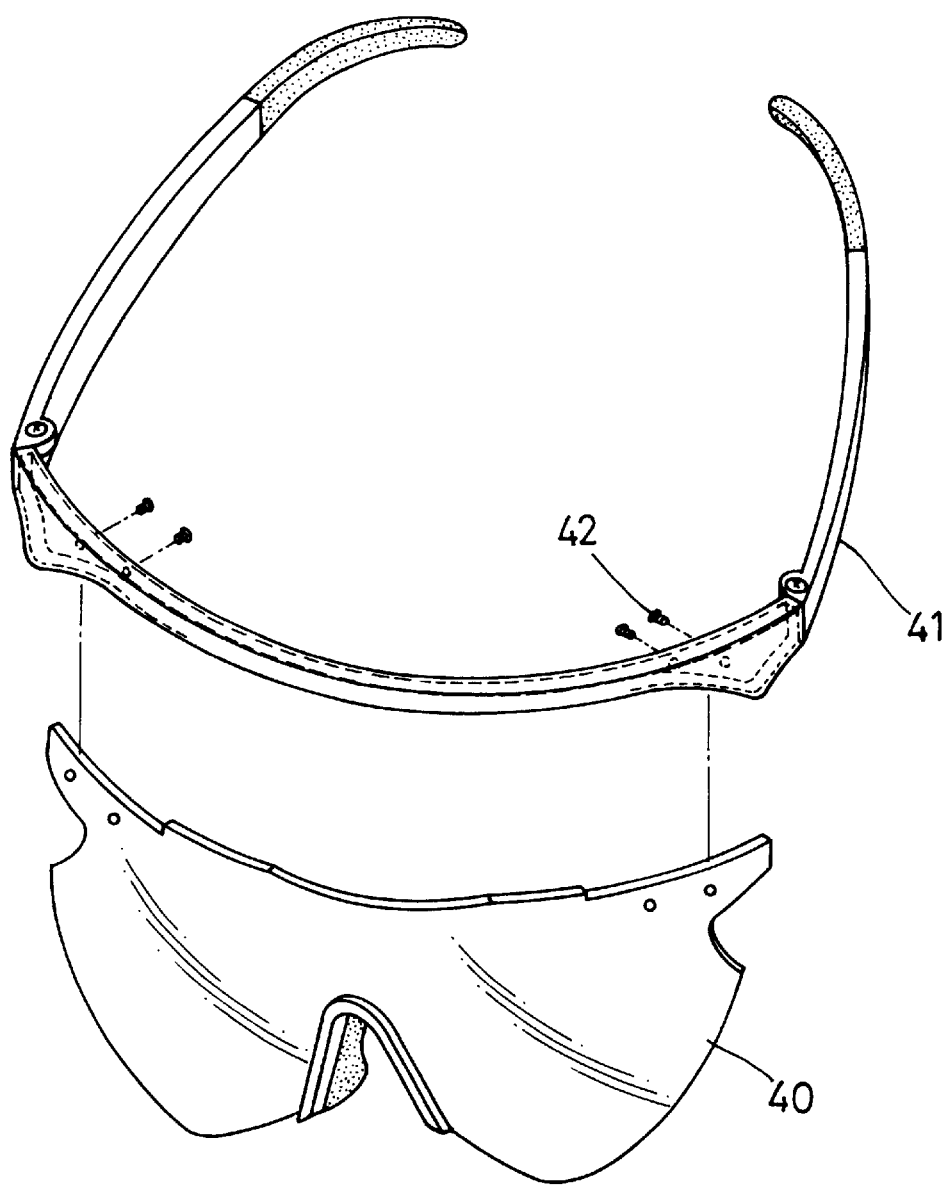
FIG. 1 is an exploded perspective view of a pair of known conventional eyeglasses.
Figure 2:
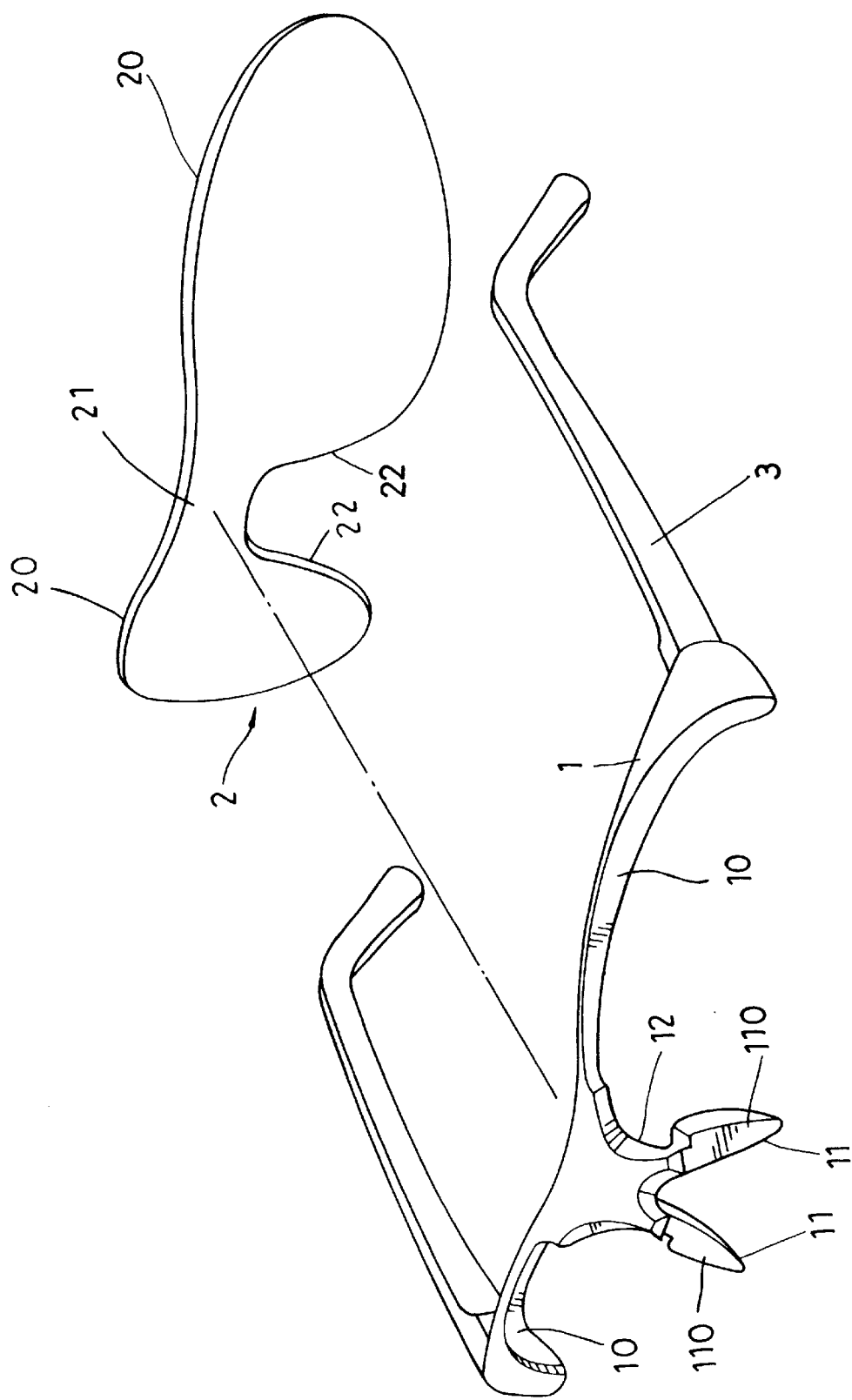
FIG. 2 is a perspective view of a pair of eyeglasses with a one-piece lens rapidly changeable in the present invention.
Figure 3:
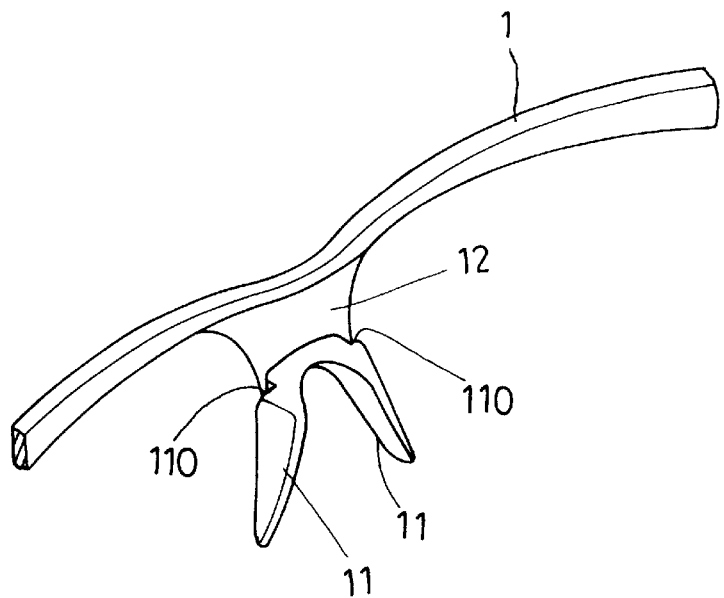
FIG. 3 is a perspective view of showing an inner structure of a frame of the pair of eyeglasses with a one-piece lens rapidly changeable in the present invention.
Figure 4:
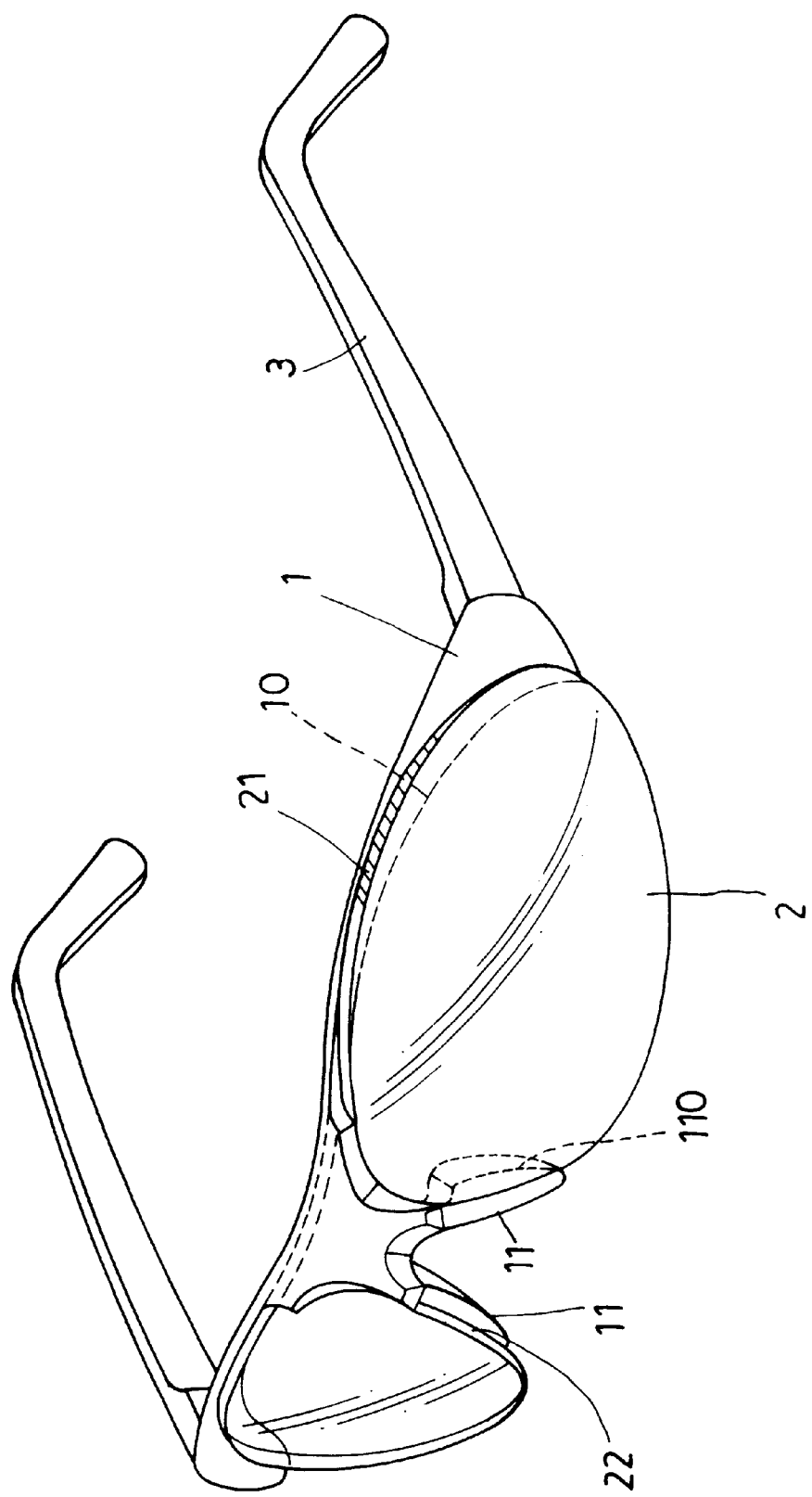
FIG. 4 is a perspective view of showing an assemblage of the frame and a lens of the pair of eyeglasses with a one-piece lens rapidly changeable in the present invention.

A preferred embodiment of the pair of eyeglasses with a one-piece lens rapidly changeable in the present invention, as shown in FIGS. 2, 3 and 4, relates to a pair of eyeglasses including an integral frame 1 made of plastics, a one-piece lens 2 and two temples 3 pivoted at both sides of the frame 1. The frame has two retaining edges 10 formed along the upper curved edges at both sides of the frame 1, two nosepieces 11 disposed in a central portion of the frame 1 and each having a flat supporting edge 110 formed on an outer surface of each of the two nosepieces, and a hollow part 12 formed inside a bridge of the frame 1 and above the two nosepieces 11, as shown in FIG. 3. The one-piece lens 2 has two upper edges 20 correspondingly attached against the two retaining edges 10 of the frame 1, a waist 21 formed in a middle opposite-incurved portion and being made a little wider than the hollow part 12 of the frame 1 so as to be fitted in the hollow part 12 of the frame 1 tightly, and two central edges 22 correspondingly rested against the two flat supporting edges 110 of the two nosepieces 11.

Figure 5:
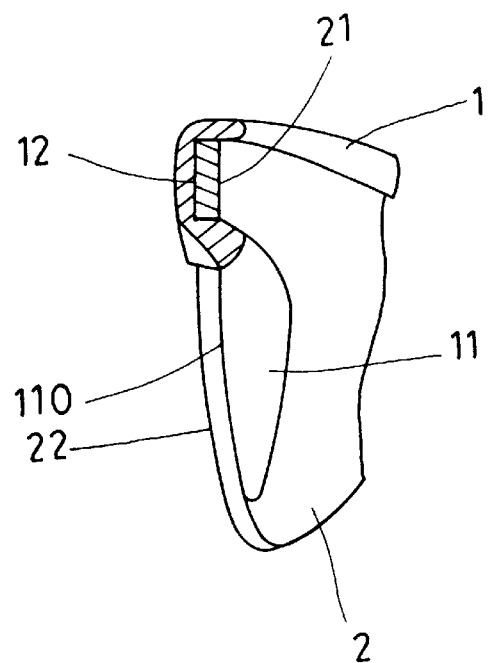
FIG. 5 is a side cross-sectional view of showing the assemblage of the frame and the lens of the pair of eyeglasses with a one-piece lens rapidly changeable in the present invention; and, FIG. 6 is a schematic view of the pair of eyeglasses with a one-piece lens rapidly changeable in the present invention, showing a user wearing the pair of eyeglasses.

In assembling, referring to FIGS. 2, 3, 4, 5 and 6, firstly fit the waist 21 of the one-piece lens 2 in the hollow part 12 of the frame 1 tightly, as shown in FIG. 5. Secondly, correspondingly rest the two central edges 22 of the one-piece lens 2 against the two flat supporting edges 110 of the two nosepieces 11 for assembling the one-piece lens 2 to the frame 1 temporarily. Finally, outwardly pull the two upper edges 20 of the one-piece lens 2 so as to be correspondingly attached against the two retaining edges 10 of the frame 1, as shown in FIG. 4, by which a whole structure of the pair of eyeglasses is assembled rapidly. Moreover, the ways of having the waist 21 of the one-piece lens 2 fitted in the hollow part 12 of the frame 1, having the two central edges 22 of the one-piece lens 2 correspondingly rested against the two flat supporting edges 110 of the two nosepieces 11 and having the two upper edges 20 of the one-piece lens 2 correspondingly attached against the two retaining edges 10 of the frame 1 make the frame 1 and the one-piece lens 2 joined together by correspondingly fastening and positioning to each other both in inside and outside attachments, i.e. respectively in the positions of the bridge, the two nosepieces and the two upper edges, so as to achieve a firm assemblage without the possibility of coming loose.

Figure 6:

In using, referring to FIG. 6, the two temples 3 are expanded outwardly by a wearer, by which the two retaining edges 10 of the frame 1 can be attached closer to the two upper edges 20 of the one-piece lens 2. Provided that the one-piece lens 2 is to be changed to a different one, the two upper edges 20 of the one-piece lens 2 are pushed away from the frame 1, and then the waist 21 of the one-piece lens 2 can be pulled out of the holding of the hollow part 12 of the frame 1 with a little force, by which the one-piece lens 2 is easily taken off the frame 1. Therefore, a user himself can rapidly assemble or disassemble the one-piece lens 2 into or away from the frame 1 to change to those of his favorite ones under his consideration so as to achieve the best effect of using the pair of the eyeglasses in the invention.

The invention has the following advantages, as can be understood from the aforesaid description.

1. A user himself can easily and rapidly change a one-piece lens by having the one-piece lens quickly and firmly fitted in or taken off the frame 1 without need of any tools, showing the convenience and utility of the pair of the eyeglasses.

2. The pair of the eyeglasses is assembled without screws; therefore, there is not the slightest fear of any loosened screws to disconnect the lens with the frame, which greatly raises safeness to users.

3. The pair of the eyeglasses is assembled and disassembled without screws and any auxiliary tools, which can lower production cost and increase economic efficiency.

4. The pair of the eyeglasses is convenient for users to change different one-piece lenses with different colors and styles to satisfy with his requirements in different weathers or situations.

While the preferred embodiment of the invention has been described above, it will be recognized and understood that various modifications may be made therein and the appended claims are intended to cover all such modifications that may fall within the spirit and scope of the invention.

What is claimed is:

1. Eyeglasses with a one-piece lens rapidly changeable comprising a frame pivoted with two temples at both sides of said frame and a one-piece lens fitted in a lower portion of said frame, wherein said frame has two retaining edges formed along two upper edges of said frame, two nosepieces disposed in a central portion of said frame and each having a flat supporting edge formed on an outer surface of each said nosepiece, and a hollow part formed inside a bridge of said frame and above said two nosepieces; a waist formed in a middle portion of said one-piece lens capable of being fitted in said hollow part of said frame, letting two upper edges of said one-piece lens correspondingly attached against two outer surfaces of said two retaining edges of said frame, and two central edges of said one-piece lens correspondingly rested against said two flat supporting edges of said two nosepieces;

whereby said frame and said one-piece lens are capable of being joined together by correspondingly fastening and positioning to each other both in inside and outside attachments so as to achieve a firm assemblage and allow said one-piece lens to be fitted in or taken off said frame with fastness and convenience.

* * * * *